H. R. KIDNEY.
COMPENSATING DRIVING MECHANISM FOR MOTOR VEHICLES.
APPLICATION FILED JUNE 14, 1919.
1,351,761.
Patented Sept. 7, 1920.
2 SHEETS—SHEET 2.
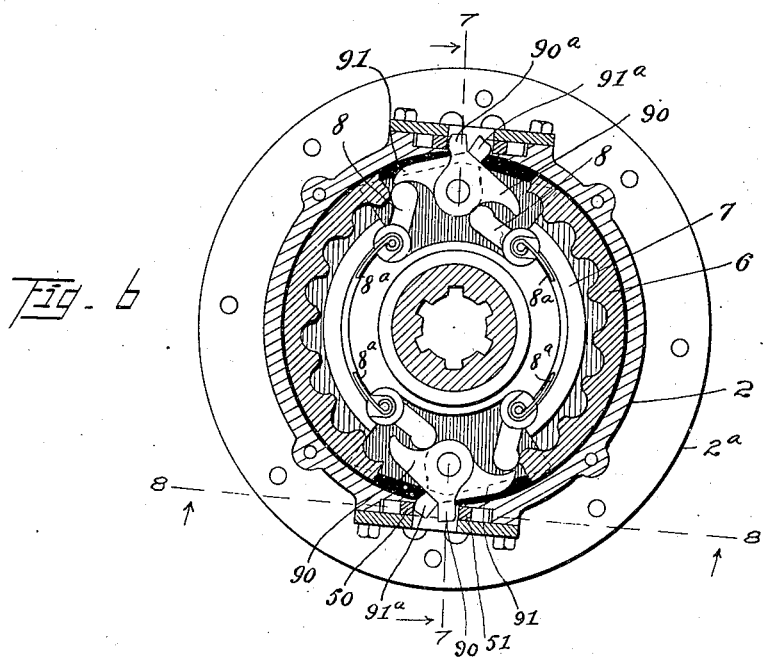
Fig. 6
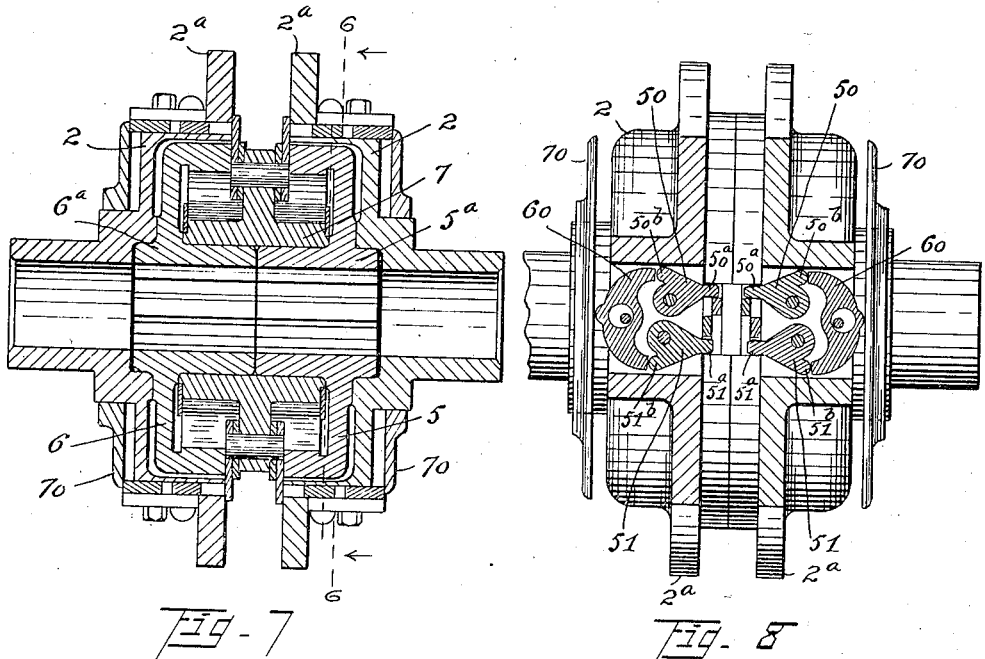
Fig. 7
Fig. 8
Inventor
HARVEY R. KIDNEY
By Norris F. Griswold
Atty.

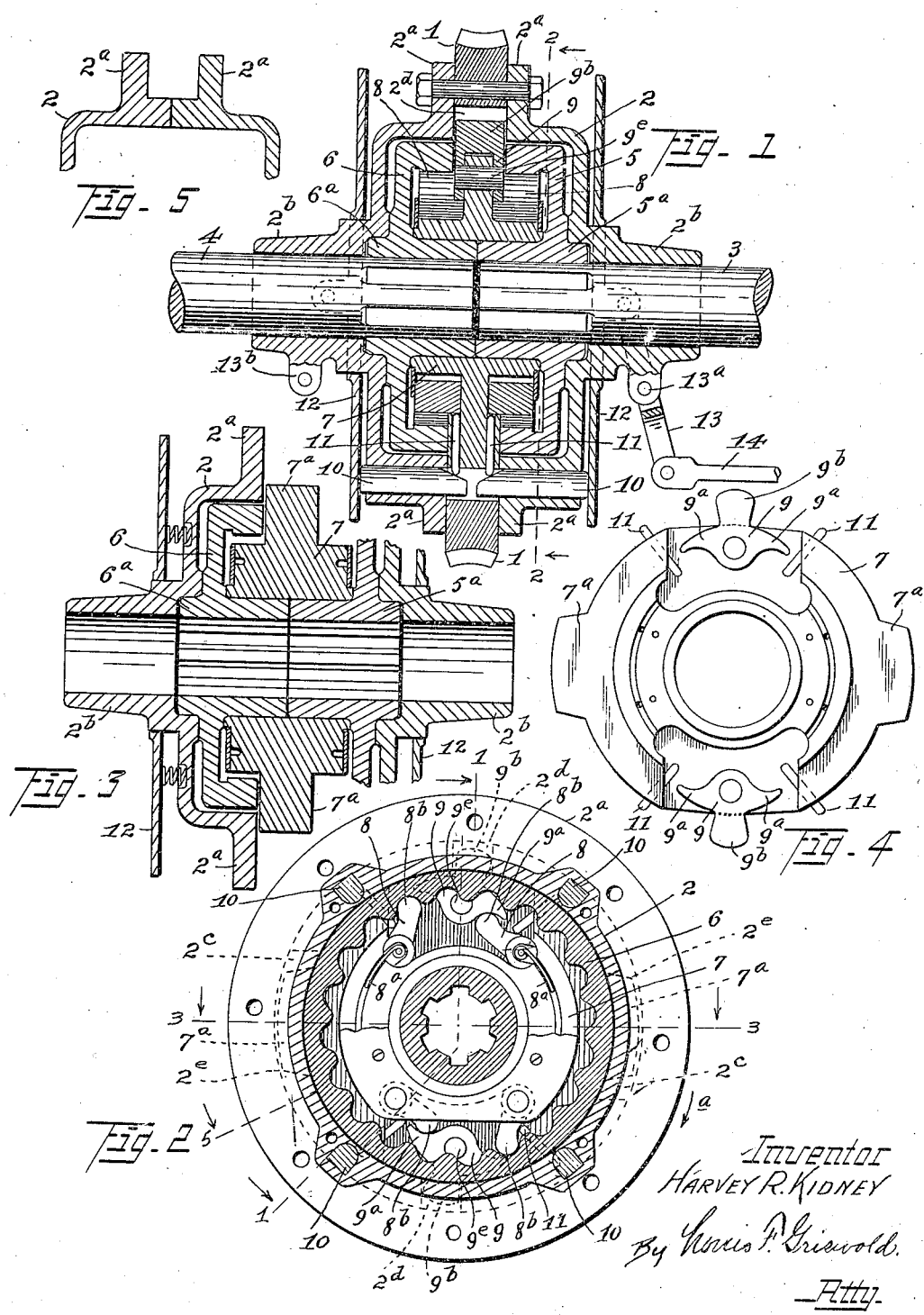

UNITED STATES PATENT OFFICE.

HARVEY R. KIDNEY, OF CLEVELAND, OHIO.

COMPENSATING DRIVING MECHANISM FOR MOTOR-VEHICLES.

1,351,761. Specification of Letters Patent. Patented Sept. 7, 1920.

Application filed June 14, 1919. Serial No. 304,156.

*To all whom it may concern:*

Be it known that I, HARVEY R. KIDNEY, a citizen of the United States, residing at Cleveland, in the county of Cuyahoga and State of Ohio, have invented certain new and useful Improvements in Compensating Driving Mechanism for Motor-Vehicles, of which the following is a specification.

This invention relates to the driving mechanism of motor vehicles, and more particularly to that part of the drive which is associated with the rear axle and which transmits the power "differentially" to the wheels. The present invention consists in improved mechanism which is adaptable to an embodiment of certain compensating mechanism for which patents have been granted, the primary object being to adapt the said mechanism to use on tractors wherein it is very desirable to provide for making short curves, or abrupt turns.

The patents referred to are No. 1,238,730, bearing date of September 4th, 1917, and No. 1,265,160, dated May 7th, 1918. In these patents certain mechanism is described and claimed, that provides particularly for a positive drive of both wheels under all conditions, so that one wheel cannot spin ahead of the other, the inner wheel on a curve being always positively driven in the direction in which the vehicle is moving, and the other wheel also positively driven as soon as the vehicle resumes a straight line, the drive always being positive, irrespective of the amount of load borne, or resistance encountered by the wheel.

My invention comprises novel mechanism that coöperates with the elements employed in an embodiment of the inventions aforesaid, and is therefore an improvement on said inventions, providing greater efficiency.

The embodiment of the present invention as illustrated in the accompanying drawings, which are made a part of the specification, provide modifications in details of construction that adapt the driving mechanism covered by the above cited patent, to the improvement.

The improvement provides mechanism whereby the operator may render both forward or reverse drive inoperative on either side, thereby making it possible for the machine to take short curves, or abrupt turns, the inner wheel being inoperative and practically acting as a pivot, while the curve is described by the driven outer wheel. This, as before stated, is an advantageous feature when the compensating mechanism is employed in tractor construction.

In the accompanying drawings Figure 1 is a sectional view of an embodiment of the invention, on line 1—1 of Fig. 2.

Fig. 2 is a complete section taken on line 2—2 of Fig. 1.

Fig. 3 is a section, partially broken, on line 3—3 of Fig. 2.

Fig. 4 is a view of a pawl carrying member which will be identified in the specification, and Fig. 5 is a section of the casing on line 5—5 of Fig. 2.

Figs. 6, 7 and 8 illustrate a modification of the improvement, Fig. 6 being a complete section on line 6—6 of Fig. 7, and Figs. 7 and 8 sections on lines 7—7 and 8—8, respectively, of Fig. 6.

Throughout the description and in the several figures of the drawings, similar reference characters are employed to designate corresponding parts.

The present embodiment of my invention is adapted to worm-drive, but it will be understood that I am not confined to this specific construction, the improvement being equally adaptable to any gear drive.

The worm member 1 is driven by an associate worm attached to the power shaft, not shown. The member 1 is firmly attached to the dual part housing 2 between the circular flanges $2^a$. Journal bearings $2^b$, $2^b$ are provided on the housing 2 for the shafts 3 and 4. Two internally toothed, or fluted ratchet wheels 5 and 6 have their hubs $5^a$ and $6^a$ splined, respectively on the driving shafts 3 and 4, as shown in Fig. 1. A pawl carrier 7 is mounted on the hubs $5^a$ and $6^a$, and is adapted to oscillate thereon. Said pawl carrier is provided with arcuate peripheral lugs $7^a$, $7^a$ that extend into recesses $2^c$ that are formed between the two halves of the housing 2, diametrically opposite, as shown dotted in Fig. 2. Corresponding series of pawls 8 are mounted on both sides of the member 7, said pawls being normally forced into engagement with the teeth of the ratchet members 5 and 6 by springs $8^a$. Rocker blocks 9 are pivotally mounted on the member 7, said blocks being provided with fingers $9^a$ which extend on both sides of said member 7, and are adapted to engage the free ends $8^b$ of the pawls 8. The blocks 9 are also provided with heads $9^b$, said heads being confined in recesses $2^d$ that are formed diametrically opposite, between the two halves of the housing 2, best shown by dotted lines in Fig. 2.

When the housing 2 is driven in the direction of arrow *a*, Fig. 2, through the medium of the worm ring 1, the shoulders 2ᵉ of the recesses 2ᶜ, bearing on the lugs 7ᵃ, rotate the pawl carrier 7 a limited distance. It will be noted, however, that the arcuate dimensions of the recesses 2ᶜ are somewhat greater than the arcuate dimensions of the peripheral lugs 7ᵃ, therefore the housing 2 will rotate a distance equal to the difference in said dimensions before the housing member 2 will act on the member 7. This causes the blocks 9 to rock on their pivots 9ᶜ, owing to the heads 9ᵇ being confined in the recesses 2ᵈ, resulting in the alternate engagement and disengagement of said blocks with the pawls 8. That is to say the diametrically opposite pawls, on both sides of the member 7 will be in mesh with the teeth of the members 5 and 6, while the alternate pawls will be forced out of mesh with said teeth. The pawls 8 that are in mesh with the teeth of the members 5 and 6, drive said members 5 and 6, and through the splined connection of said members drive the shafts 3 and 4 in a forward or reverse direction. In either case, since the power is transmitted independently to both wheels, it will always, with the mechanism thus far described, be the inner wheel alone which drives the vehicle on a curve, the outer wheel running freely. In other words, the inner wheel on a curve is positively driven in the direction in which the vehicle is moving, and the other wheel is also positively driven as soon as the vehicle resumes a straight line, the drive being always positive. If the housing is driven in the opposite direction, the reverse of the above described function will result.

The mechanism thus far described is similar to that embodied in the patents above mentioned. By the addition of my improvement to the mechanism, the power can be transmitted to the outer wheel, in a novel way, while the inner wheel idles, or forms a pivot.

The improvement consists broadly in the provision of novel means for disengaging all of the pawls, on one or the other side of the member 7, from the teeth of the members that are splined to the driving shafts, so that either wheel may idle while the other is driven.

In the embodiment illustrated in Figs. 1 to 5, inclusive, the driven housing 2 is provided with a series of apertures which extend therethrough parallel to the drive shafts. The said apertures correspond in number to the number of pawls 8, and are regularly arranged relatively to said pawls, being in the same diametrical planes. The said apertures in the housing 2, provide bearings for slidable pins 10. The pins 10 are beveled at their inner ends, the beveled portions bearing on secondary pins 11 which are housed in the member 7, positioned at an angle to the pins 10 and adapted to operate on the pawls 8, their function being to release said pawls from engagement with the teeth of the members 5 or 6. The releasing operation is brought about as follows: Disks 12 are mounted on the extensions 2ᵇ of the housing members 2, said elements 2ᵇ being adapted to revolve freely in central openings in said disks. The disks 12 bear on the outer terminals of the pins 10, and are reciprocally movable through the medium of levers fulcrumed on the housing members 2, one only of said levers 13 being shown in Fig. 1, fulcrumed at 13ᵃ and operated by a suitable member 14. It is obvious that a like lever and operating member would be fulcrumed at 13ᵇ for actuating the opposite disk for the same purpose.

Normally the disks 12 are in outward positions, as shown in Fig. 3, and the pins 10 are forced outward, or held in contact with said disks through the action of the pawls 8 and springs 8ᵃ, the members 14, of course, being free. In this condition the mechanism is capable of performing all the functions provided for in the patents hereinbefore referred to, and as described.

In either forward or reverse movement of the vehicle two opposite pawls on each side of the member 7 are out of engagement with the teeth of the driving ratchet members 5 and 6, while the alternate pawls are in engagement. If it is desired to make an abrupt turn to the right, the disk 12 located on the right side is forced inward by the lever 13, thereby pressing the pins 10 inward. The inclined inner portions of said pins bearing on the secondary pins 11 cause said pins to dislodge the pawls 8 that are in engagement with the driving members 5 or 6, as the case may be. Power is thus entirely released from the right wheel while the left wheel is being driven. This will cause the vehicle to substantially pivot on the right wheel while the curve is described by the left or driven wheel. It is obvious that a turn to the left can be made in the same manner by actuating the left disk and allowing the right one to remain normal.

In the modification illustrated in Figs. 6, 7 and 8, the general construction, arrangement and coöperation of the elements is the same as that above described, but the pawl releasing mechanism differs in construction and operation, as will now be explained.

The coöperating members 2, 3, 4, 5, 6, 7 and 8 are constructed and arranged the same as hereinbefore described, and the rocker members are pivoted on the member 7 and perform the same function. Said rockers are, however, each made in two parts 90 and 91 provided, respectively, with heads 90$^a$ and 91$^a$ which are acted upon, for the same purpose of releasing the alternate pawls in the same manner as in the former case. Levers 50 and 51 of the bell-crank type, are pivoted in the housing member 2, as shown. The arms 50$^a$ and 51$^a$ of said levers are in engagement with the outer faces of the heads 90$^a$ and 91$^a$, while the arms 50$^b$ and 51$^b$ are in engagement with slidable plates 60, which are operated upon by disks 70 actuated in the same manner as the disks 12 of the former structure. It will readily be seen that when the disks 70 are pressed inward, the plates 60 acting on the arms 50$^b$ and 51$^b$ will cause the levers 50 and 51 to oscillate on their pivots, and the arms 50$^a$ and 51$^a$ acting on the heads 90$^a$ and 91$^a$ will cause the members 90 and 91 to dislodge the pawls 8 that are in engagement with the driving ratchet members 5 and 6, thereby releasing the driving mechanism on the side of the machine on which the disk is operated.

It will be understood that there may be various changes in the details of construction of my improved mechanism without departure from the spirit of the invention, and that I am not confined to the specific design and arrangement of parts as described only so far as limited by the scope of the claims.

What I claim is—

1. A driving mechanism for motor vehicles, comprising the combination of two alined wheel shafts, a driving gear mounted on said shafts and capable of a limited movement thereon, ratchet clutches connecting the driving gear with the wheel shafts for forward drive and for reverse drive, said clutches being automatically thrown into and out of operative position by said turning movement of the gear on the wheel shafts, and means for throwing said clutches out of engagement independently of the automatically operative means.

2. In driving mechanism for motor vehicles, the combination with the wheel shafts and power shaft, of automatic means for connecting the latter to both the wheel shafts for forward drive, means operated automatically by the reversal of the power shaft to connect the latter to both wheel shafts for reverse drive, and means for disconnecting the drive of either one of the wheel shafts, said means being operative independently of the automatic means.

3. In driving mechanism for motor vehicles, the combination with two wheel shafts and the power shaft, of means connecting the wheel shafts with said power shaft for forward or reverse drive while accelerating either wheel shaft, a driving gear mounted on the wheel shafts so as to have a limited motion thereon, the said connecting means comprising overriding clutches for connecting the driving gear with the wheel shafts, said clutches being automatically operated by the limited turning movement of the gear member on the wheel shafts, means for disconnecting the clutches independently of the automatic means so that either wheel may be caused to idle while the companion wheel is positively driven either forward or reverse.

4. A driving mechanism for motor vehicles, comprising the combination with the power shaft, of a divided shaft connected at its outer ends with the vehicle wheels, ratchet wheels on the inner adjacent ends of said shaft, a driving gear mounted on the divided shaft so as to have a limited turning movement thereon, a pawl supporting member mounted on the hubs of the ratchet wheels, spring actuated pawls carried on said support, said pawls being adapted to engage the ratchet wheels, and being alternately disposed for forward and reverse drive, means connected with the pawl supporting member and coacting with the limited movement of the driving gear for releasing oppositely disposed pawls from engagement with the ratchet members and permitting the alternate pawls to perform their driving function, and means connected with the driving gear member and acting on the engaged pawls for disengaging said pawls independently of the automatic movement.

In testimony whereof I affix my signature.

HARVEY R. KIDNEY.